Figure 1:
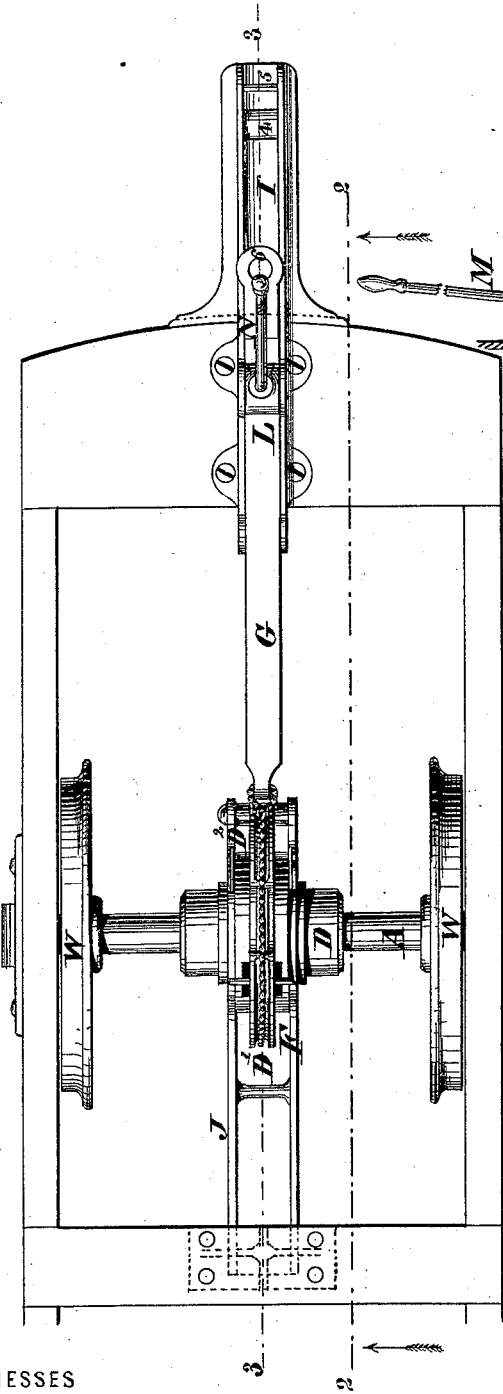

2 Sheets--Sheet 1.

E. AMES.
Car-Starters.

No. 157,777. Patented Dec. 15, 1874.

WITNESSES
Jas. L. Ewin
Henry Tanner.

INVENTOR
Emerson Ames.
By Knight & Bro. Attorneys

2 Sheets--Sheet 2.
E. AMES.
Car-Starters.
No. 157,777. Patented Dec. 15, 1874.
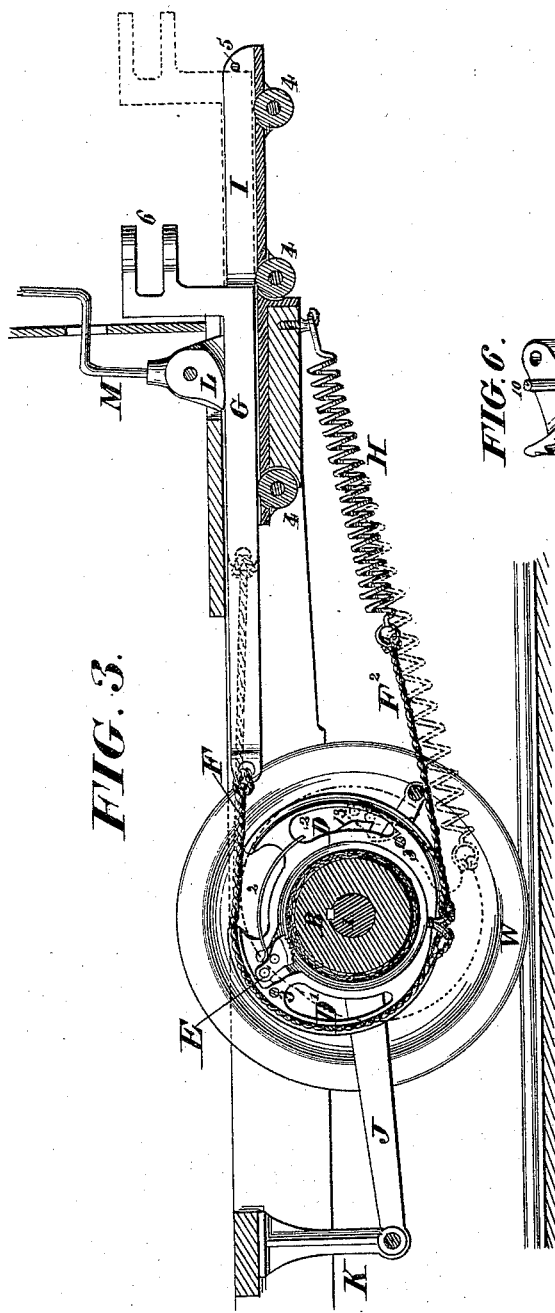
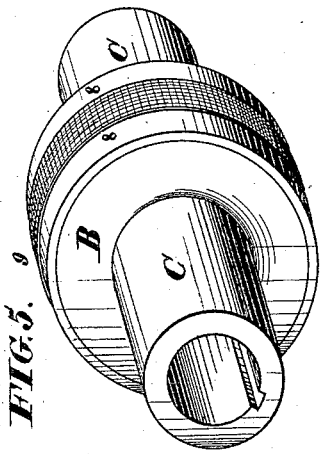
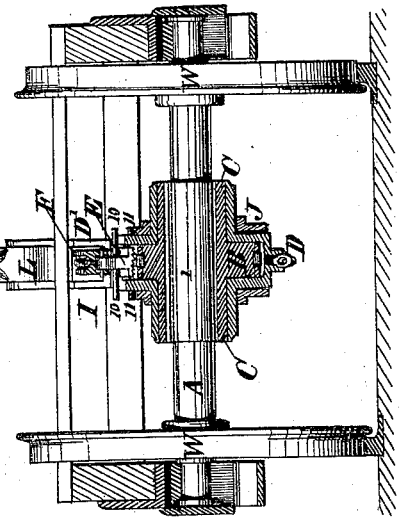
WITNESSES
INVENTOR
Emerson Ames
By Knight Bro. Attorneys

UNITED STATES PATENT OFFICE.

EMERSON AMES, OF BALTIMORE, MARYLAND.

IMPROVEMENT IN CAR-STARTERS.

Specification forming part of Letters Patent No. 157,777, dated December 15, 1874; application filed November 6, 1874.

*To all whom it may concern:*

Be it known that I, EMERSON AMES, of the city of Baltimore, in the State of Maryland, have invented certain new and useful Improvements in Car-Starters, of which the following is a specification:

This invention relates to those car-starters in which the power of the horses is applied to the car at times indirectly instead of directly, in order to overcome the inertia of the stopped car, or to lessen or assist the draft on heavy grades.

The first part of the present invention consists in a peculiar combination of devices, hereinafter specified, by means of which the forward movement of the horses is indirectly transmitted to the car, at the will of the driver, through the medium of leverage applied to the car-axles, the said leverage being gradually lessened as the forward movement of the car takes place, in order to gradually increase the directness of the application of the draft, and, at the same time, to increase the relative movement produced by the draft, so as to avoid any sudden strain on the horses, and to insure a steady forward movement of the car.

The invention consists, secondly, in the employment or use of a steel friction pawl or cam having a toothed face or periphery for connecting the eccentric or outer wheel of the starter to an inner wheel, which is keyed or otherwise fixed on the axle, the said inner wheel being made of malleable iron, or having wrought-iron tires applied thereto, in order to present a relatively soft periphery. The inseparable union of the outer and inner wheels during the forward movements of the former is thus insured, which is of great importance, while the friction pawl or cam becomes disengaged from the inner wheel the instant the reverse movement of the outer wheel or the independent forward rotation of the axle begins.

The invention consists, thirdly, in a ring or band of caoutchouc, or any other elastic substance, applied to the periphery of the inner wheel, in combination with a friction pawl or cam, to insure an immediate bite of the latter at the beginning of the effective movement of the outer wheel or eccentric, so that every inch of movement shall be utilized. The elastic substance affords a temporary hold for the friction pawl or cam, and draws it into effectual mesh with the metal periphery of the wheel.

The invention consists, fourthly, in the employment or use of a spring or springs, constructed and applied in peculiar manner, in combination with pins or projections on the friction pawl or cam, to insure the disengagement of the latter from the periphery of the inner wheel in peculiar manner. The springs store a sufficient amount of power during the forward movement of the pawl or cam, and operate to instantaneously release the latter when the reverse movement of the eccentric or outer wheel or the independent forward rotation of the axle begins, thus accomplishing this effect without strain on any part.

The invention consists, fifthly, in a hand-lever terminating in an eccentric or cam adapted to engage with the draft-bar, so as to hold the latter in its inner position, in order to reserve the starter for use in special exigency, as for passing steep grades and curves.

Figure 2:
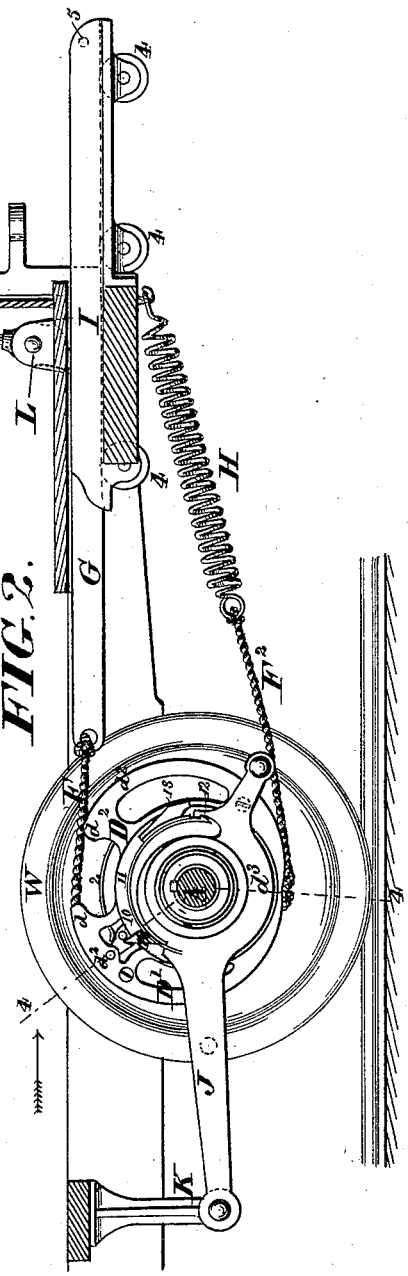

In the accompanying drawing, Figure 1 is a plan view of a portion of the frame and running-gear of a street-car illustrating this invention. Fig. 2 is a vertical longitudinal section on the line 2 2, Fig. 1, showing the starting mechanism in elevation. Fig. 3 is a vertical longitudinal section through the car-starter on the line 3 3, Fig. 1, showing parts in different positions. Fig. 4 is a transverse section on the line 4 4, Fig. 2. Fig. 5 is a perspective view of the starting-wheel. Fig. 6 is a perspective view of the friction pawl or cam detached.

Like letters of reference indicate corresponding parts in the several figures.

For the reception of this improved car-starter the axle or axles A, to which it is to be applied, are each, by preference, constructed with a central cylindrical enlargement, 1, having a longitudinal key-seat or spline. To this a wheel, B, is applied, so as to be fast at the center of the axle. This wheel is constructed with an extended cylindrical hub, C, to constitute a sleeve. The sleeve may, if preferred, be constructed separately and the wheel applied thereto by shrinking or other means. This inner wheel B is inclosed by an outer wheel, D, which is made in two or more parts, recessed to receive the inner wheel, and constructed with extended hubs to embrace those of the latter or the ends of the sleeve C. This outer wheel is adapted to rotate freely on the inner wheel and sleeve, except as the two wheels are united by a friction-pawl or cam, E, which is arranged in a recess of the outer wheel, and rests on the periphery of the inner wheel, and is gently pressed downward or held to its work by a light spring, 2, similarly arranged. The outer wheel thus constitutes a case for all the parts, which could be obstructed or rendered inoperative by the accumulation of dust. It is, by preference, made in two parts, united, in line with the longitudinal center of the car, by means of transverse bolts 3. This outer wheel D has an irregular eccentric periphery, which is grooved to accommodate ropes or chains F F$^2$, through which the movements of the outer wheel are effected. That portion of the body of the outer wheel which is outside of the immediate casing of the inner wheel operates exclusively to form this eccentric periphery, except as it carries and incloses the friction pawl or cam E and its spring.

For its primary purpose, this portion of the outer wheel is divided into two prominent sections, D$^1$ D$^2$, which may occupy the whole or only portions of the circumference of the wheel. Both sections, by preference, carry similar portions of the eccentric periphery; and this, by preference, comprises short concentric portions, (as from $d$ to $d^2$, Fig. 2,) at the most prominent points of the periphery, and gradually-receding portions, (as from $d^2$ to $d^3$,) extending from the prominent points to a point or points, $d^3$, as near as practicable to the axle. The ropes or chains F F$^2$ are attached at the point or points $d^3$ in any approved way, and wrap on the sections D$^1$ D$^2$, or unwrap therefrom, respectively and alternately, during the operation of the device. The respective ropes or chains connect the outer wheel or eccentric to a draft-bar, G, and to a retracting-spring, H. The former slides longitudinally in a guide-trough, I, furnished with anti-friction rollers 4 4 in its bottom, and provided at its outer end with a stop, 5, to limit the projection or outward movement of the draft-bar. The front end of the draft-bar is bent upward, and terminates in a clevis-head, 6, sufficiently above the guide-trough to receive and accommodate an ordinary whiffletree with its coupling-bolt, by which the draft is applied. The spring H is attached to a convenient portion of the floor-frame of the car-body or platform. It may be of any approved form, and means for regulating its tension may be introduced. Its necessary function is to return the outer wheel or eccentric, and the friction-pawl or cam therein, to their starting positions.

In the illustration this same spring serves simultaneously to retract the draft-bar G and the attached whiffletree. A stronger supplemental spring for the latter purpose may be applied in line with the draft-bar, so as to act directly thereon.

The starting rope or chain F and the retracting rope or chain F$^2$ impart motion, respectively, to the outer wheel or eccentric D in unwinding, and their leverage and power are obviously greatest when they are unwinding from the most prominent points of the eccentric periphery. These prominent points are extended concentrically, as described, to cause this maximum leverage to continue long enough for an actual movement of the entire car to be effected in starting, and for the inertia of the outer wheel and the parts attached thereto, to be overcome in the act of resetting the starter by turning back the outer wheel or eccentric. After the ropes or chains leave these points their leverage is steadily decreased and the relative speed of the outer wheel or eccentric is correspondingly increased until their action ceases.

The beneficial effects of this graduated action in starting are to avoid any sudden shock or strain on the horses at the end of the starting operation, and to apply the draft more and more directly as the speed of the car increases, so as to adapt the power to the work and to insure a steady forward movement of the car from the start.

The effect in resetting the starter is to avoid unnecessary strain on the parts. The periphery of the section D$^2$, used in resetting, may, however, be made concentric without very materially affecting the operation of the device.

The friction-pawl or cam E is, by preference, constructed of steel or faced with steel, and its face 7 is serrated or toothed, as illustrated most clearly in Fig. 6; and the inner wheel B is constructed of malleable iron or provided with one or more bands or tires, 8, (Fig. 5,) of wrought-iron, to coact therewith. In either case a relatively soft periphery is presented by the inner wheel B to mesh with the steel friction pawl or cam E. The form, number, and arrangement of the serrations or teeth on the face of the pawl or cam E are not essential.

To afford a temporary hold for the friction pawl or cam in the first instant of effective movement, or to draw the friction pawl or cam instantaneously into effective mesh, so as to preclude any loss of motion at this important point, a ring or band, 9, of rubber or other elastic material, is applied to the periphery of the inner wheel B, which is provided with a shallow circumferential groove for its reception. In the illustration this groove is formed by the wrought-iron tires 8. It will be observed that this elastic ring is subjected to very little wear or strain. The central portion of the face of the toothed friction-pawl or cam, which engages with the elastic ring, may be made smooth and more prominent.

To provide for disengaging the pawl or cam at the instant of reversal, or as soon as it is released by the beginning of the backward movement of the outer wheel, or the independent forward rotation of the axle, the same is provided on its sides with pins or projections 10 in front of the radial line of its pivot. These engage in the forward motion of the outer wheel or eccentric with a pair of springs, 11. The springs 11 are stationary with reference to the wheels and axle, and are supported by a light frame, J, which affords supplemental general support to the axle - attachments in the line of draft and against spreading. This frame is composed of two parallel plates united by strut-bolts, and is attached by a horizontal pivot to the lower end of a hanger-bracket, K, depending from the floor-frame of the car-body, and it embraces the hubs of the outer wheel D, and these turn freely therein, so as not to obstruct the vertical movement of the car-body on the springs. The tripping-springs 11 are rigidly attached at their rear ends to the respective plates of the supplemental frame J, and in the illustration their front ends are secured against displacement by catches 12, Fig. 2.

To engage with the pins 10 on the pawl or cam these tripping-springs have projections or prominent surfaces 13, which may be formed by bends in the springs. These springs are gradually depressed by the pins during the effective movement of the pawl or cam, and the pins finally pass upon the prominent surfaces 13.

The springs now tend to disengage the pawl or cam, and they do this against the light pressure of the holding-spring 2 as soon as the pawl or cam is released, and these support the pawl or cam out of contact while the draft-bar remains projected, as shown in dotted lines in Fig. 3.

When the car is stopped, or while in motion, if desired, the retraction of the parts is permitted, and this is automatically effected by the retracting spring or springs H.

This resets the starter, or returns the parts to normal position, in which they are represented in Figs. 1, 2, and 4, and in full lines in Fig. 3, the starting rope or chain F being wound on its section $D^1$ of the outer wheel or eccentric, while the retracting rope or chain $F^2$ is unwinding from its section $D^2$.

To disengage the friction-pawl or cam E at the end of this reverse movement thereof, and to support it out of contact while the draft-bar remains retracted, as shown in full lines in Fig. 3, the tripping - springs 11 are provided near their rear ends with stop-projections 14 to come in contact with the pins 10 at the proper moment. These projections may be supported otherwise by the frame J, if preferred. These provisions serve to prevent undue wear of the inner wheel, and the latter serves also to provide for backing the car when desired, and for the use of the improved starter on double cars, or those which are designed to run either way. As thus applied, a starter is attached to each axle. On single cars the starter is applied only to the front axle, and in either case the power is applied to the front axle alone. To reserve the starter for an exigency, as for use at a curve or steep grade, when it is not required at starting, or to render it inoperative for any purpose, a locking-cam, L, is provided, to be operated through a hand-lever, M, by the driver, and, to preclude slipping, the cam is made to engage directly with the draft-bar, and is so arranged that the outward movement of the bar shall tend to tighten the cam. The hand-lever is, by preference, bent so as to extend outward through the dash-board, and up to a convenient point on the outside.

The operation of the starter when it is brought into requisition is as follows: The parts being in normal position, as shown in full lines in Fig. 3, and the locking-cam L tripped, the draft operates through the bar G and rope or chain F on the section $D^1$ of the outer wheel or eccentric D, and forcibly rotates the latter. The first effect is the release of the toothed friction pawl or cam E from the tripping-stop 14. The spring 2 simultaneously throws the pawl or cam against the elastic ring 9, and the latter draws it into intimate mesh with the malleable periphery of the inner wheel B. The continued movement is now transmitted without loss to the axle A, and therethrough to the traction-wheels W, with equal power at first, and then with gradually decreasing power, and correspondingly increasing motion, until the scope of the starter has been exhausted, when the draft is transferred without sudden strain to the car direct through the draft-bar G and its trough I. If the first action fails, a moment suffices to reset the starter, when it can be used again as before, and so on repeatedly.

The following is claimed as new in this invention, namely:

1. The outer wheel D, having an eccentric periphery, in combination with a rope or chain, F, and a sliding draft-bar, G, for applying motion to the car-axle, with gradually-decreasing leverage and increasing speed, substantially as herein set forth.

2. The steel friction-pawl or cam E, having a serrated or toothed face, 7, in combination with the inner wheel B having a periphery, 8, of wrought or malleable iron, for the purpose specified.

3. The tripping-springs 11, supported by the stationary frame J, and having projections 13, in combination with the starting pawl or cam E having pins or projections 10 to engage therewith, for the purpose set forth.

4. The locking-cam L, to engage with the draft-bar G for reserving the starter, or for rendering it temporarily inoperative, as set forth.

5. The combination of the sliding draft-bar G, rope or chain F, outer wheel or eccentric D, friction-pawl or cam E, and tight inner wheel B for applying power to an axle, A, as set forth.

6. The combination of the retracting-spring H, the rope or chain F², and the section D² of the outer wheel or eccentric, for restoring the parts, as set forth.

7. The inner wheel B, as provided with the elastic ring or band 9, in combination with the friction pawl or cam E, as and for the purpose set forth.

8. The guide-trough I, provided with anti-friction rollers 4, and stop 5, in combination with the draft-bar G, as and for the purpose specified.

EMERSON AMES.

Witnesses:
WM. F. EBERWEIN,
W. H. HAYWARD.